United States Patent
Brandt

(10) Patent No.: US 8,145,214 B2
(45) Date of Patent: Mar. 27, 2012

(54) RASTER SKIPPING IN CO-BANDED MOBILE COMMUNICATION DEVICES BASED ON PREVIOUS SCANS FOR ANY BAND

(75) Inventor: Steven R. Brandt, Grayslake, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 1171 days.

(21) Appl. No.: 11/836,614

(22) Filed: Aug. 9, 2007

(65) Prior Publication Data
US 2009/0042566 A1 Feb. 12, 2009

(51) Int. Cl.
*H04W 4/00* (2009.01)
(52) U.S. Cl. ............... 455/434; 455/435.2; 455/448; 455/515
(58) Field of Classification Search ............... None
See application file for complete search history.

(56) References Cited

U.S. PATENT DOCUMENTS

| | | | |
|---|---|---|---|
| 5,809,419 A * | 9/1998 | Schellinger et al. | 455/434 |
| 8,023,896 B2 * | 9/2011 | Hildebrand et al. | 455/62 |
| 2004/0058679 A1 * | 3/2004 | Dillinger et al. | 455/439 |
| 2005/0202828 A1 * | 9/2005 | Pecen et al. | 455/453 |
| 2007/0042775 A1 * | 2/2007 | Umatt et al. | 455/434 |
| 2007/0189259 A1 * | 8/2007 | Sollenberger et al. | 370/342 |
| 2007/0207815 A1 * | 9/2007 | Alfano et al. | 455/456.1 |
| 2007/0207824 A1 * | 9/2007 | Bhattacharjee et al. | 455/513 |
| 2007/0230420 A1 * | 10/2007 | Bumiller et al. | 370/338 |
| 2008/0153486 A1 * | 6/2008 | Ramkull et al. | 455/434 |
| 2008/0220772 A1 * | 9/2008 | Islam et al. | 455/432.2 |
| 2009/0323609 A1 * | 12/2009 | Walton | 370/329 |

\* cited by examiner

*Primary Examiner* — Rafael Pérez-Gutiérrez
*Assistant Examiner* — German Viana Di Prisco

(57) ABSTRACT

The present invention discloses a solution for improving scan time in a co-banded mobile communication device. The solution can maintain a set of records within a data store of a co-banded mobile communication device. The set of records can include two or more communication rasters that represent an overlap between frequency bands used by different access technologies supported by the mobile communication device. A frequency band for a first access technology can be scanned for communication rasters allocated for that access technology. For each occupied communication raster, a related record of the set of maintained records can be updated to indicate that the communication raster is occupied. A frequency band for a second access technology can then be scanned within a previously determined time threshold of the first scan. The second scanning attempt can skip those communication rasters indicated as occupied by the set of records.

16 Claims, 2 Drawing Sheets

RASTER SKIPPING IN CO-BANDED MOBILE COMMUNICATION DEVICES BASED ON PREVIOUS SCANS FOR ANY BAND

BACKGROUND

1. Field of the Invention

The present invention relates to mobile telecommunication devices and, more particularly, to raster skipping in co-banded mobile communication devices based on previous scans for any band.

2. Description of the Related Art

Historically, mobile phones have been designed to operate using one access technology, such as Global System for Mobile communication (GSM), Code Division Multiple Access (CDMA), or Time Division Multiple Access (TDMA). Each of the different access technologies utilize a defined set of protocols and techniques to communicate wirelessly over a characteristic set of frequencies of the electromagnetic (EM) spectrum. These frequencies are a valued and finite resource. To maximize usage, reusing spectrum frequencies is common, which is true even among different access technologies. For example, different access technologies can share a portion of the EM spectrum. The wideband version of CDMA (WCDMA), for example, overlaps significantly with GSM frequency ranges. All of the actively used GSM bands have a WCDMA equivalent defined in the latest version of the 3GPP specifications. Co-banded mobile phones currently exist that operate seamlessly across frequency ranges of more than one access technology using suitable protocols for communicating via each supported access technology. For instance, a co-banded mobile phone can support both GSM and WCDMA based communications. Appreciably, co-banded mobile phones are not limited to GSM and WCDMA technologies. Co-banded mobile phones and other mobile communication devices exist currently and more will exist in the future that support two or more access technologies, each of which requires periodic raster scanning.

It should be appreciated that mobile phones scan a set of channel segments to find occupied bands associated with a particular access technology and mark those bands that are discovered. A smallest scan-able channel segment that is able to be used for a communication can be referred to as a communication raster. A communication raster composition and specifics can vary based upon an access technology. For example, a Frequency Division Multiple Access (FDMA) access technology (e.g., CDMA) shares the radio spectrum by allocating users different carrier frequencies of a radio spectrum. TDMA access technologies (e.g., GSM, TDMA) allow several users to share the same frequency channel by dividing the signal into different timeslots, each user using their own timeslot. A Space Division Multiple Access (SDMA) takes advantage of spatial separation between users by subdividing a base station's coverage area into sub-cells and by using directional transmissions to and from a mobile phone so that different spatially located mobile phones can share a frequency channel. Shifting phases is still another technique for dividing a single frequency channel into multiple segments, each of which can be used by a different user to wirelessly communicate.

Regardless of which access technology or technologies are being used, scanning for an available communication raster occurs in approximately the same manner. Conventional scanning occurs by ordering the rasters by power level in descending order and checking each one. Checking a raster can require decoding, which determines whether communications are able to be conducted using that raster or not. The ordered rasters are sequentially checked and decoded. If no occupied raster is detected for a given access technology during scanning, the scanning process can be reattempted after a delay period.

The large number of rasters resulting from a generous frequency ranges being allocated to different access technologies presents a problem for co-banded mobile phones. Scanning each raster in all frequency ranges for each access technology can result in excessive power usage, which can drain the batteries of handsets. Additionally, the time required to scan through multiple frequency bands increases dramatically from phones that operate in a smaller frequency band, which have to search fewer rasters. This increased scanning time can result in dialing delays, such as a scanning delay that occurs on device power-up, that frustrate users. In areas of dense usage, such as cities, scanning for all communication rasters can be extremely resource intensive. It would be advantageous if scanning times and resource use could be reduced through intelligent raster skipping in co-banded mobile phones, which is not presently being done by any known mobile device.

SUMMARY OF THE INVENTION

The present invention discloses a solution for raster skipping in co-banded mobile communication devices based on previous scans for any band. That is, when a scan for rasters is performed for a first access technology, such as GSM, an indicator is recorded in an in-device database that signifies whether the raster was occupied by that access technology. That is, the indicator can indicate whether the raster was successfully decoded as a GSM channel. When a second access technology, such as WCDMA, performs a scan soon after the first scan was conducted, overlapping frequency rasters indicated as occupied will be automatically skipped. Thus, two different access technologies that share an overlapping frequency range do not redundantly scan for communication rasters in the same frequency range.

It should be appreciated that when a co-banded communication device supports access technologies that have a significant frequency overlap, such as GSM and WCDMA, the disclosed raster skipping solution can reduce scanning times significantly. For example, a typical scanning time for GSM rasters is between five and fifty seconds and a typical scanning time for WCDMA rasters is between less than one second to twenty seconds. Thus, a conventional scanning approach for both GSM and WCDMA rasters would take 5-50 seconds for GSM plus 1-20 seconds for WCDMA for a total of 6-70 seconds. The disclosed solution, in contrast, can be configured to first scan for WCDMA rasters and then for GSM rasters. The WCDMA scan, which can take ten seconds in one instance, can determine that each raster in the frequency range is occupied for WCDMA. Assuming that the WCDMA and GSM frequencies are entirely overlapping, which is currently true in the United States, a GSM scanning attempt will skip every raster, thus taking effectively no time. Hence, the scanning for both WCDMA and GSM is significantly reduced through intelligent channel skipping.

The present invention can be implemented in accordance with numerous aspects consistent with the material presented herein. For example, one aspect of the present invention can include a method for improving scan time in a co-banded mobile communication device. The method can include a step of maintaining a set of records within a data store of a co-banded mobile communication device. The set of records can include two or more communication rasters that represent an overlap between frequency bands used by different access technologies supported by the mobile communication device. A frequency band for a first access technology can be scanned for communication rasters allocated for that access technology. For each occupied communication raster, a related record of the set of maintained records can be updated to indicate that the communication raster is occupied. A frequency band for a second access technology can then be scanned within a previously determined time threshold of the first scan. The second scanning attempt can skip those communication rasters indicated as occupied by the set of records.

Another aspect of the present invention can include a mobile communication device that includes a first and second set of band components, a scanning component, and a data store. The first set of band components can perform communication operations for wireless communications occurring over a first frequency band. The second set of band components can perform communication operations for wireless communications occurring over a second frequency band. The scanning component can scan the first frequency band and the second frequency band for an available communication raster. The data store can contain a set of records that include communication rasters that represent an overlap between the first frequency band and the second frequency band. When the scanning component performs a scan, the set of records can record when each of the communication rasters is found to be occupied. When searching for available communication rasters, the scanning component can skip rasters determined to be occupied by previous, recent scans.

Still another aspect of the present invention can include a co-banded mobile telephone that includes a scanning component. The scanning component can scan two or more frequency bands to find available communication rasters. One or more of the communication rasters in the frequency bands can overlap. The scanning component can skip at least one of the communication rasters in the overlap when scanning one of the frequency bands based upon results of previous scanning attempts performed for a different one of the frequency bands.

It should be noted that various aspects of the invention can be implemented as a program for controlling computing equipment to implement the functions described herein, or as a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
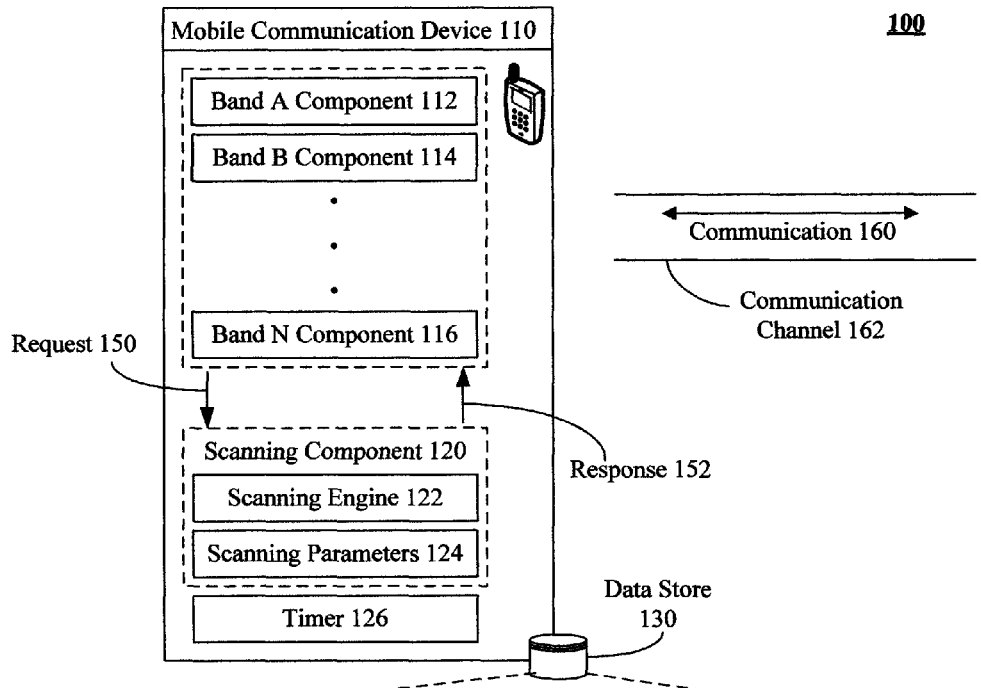
FIG. 1 is a schematic diagram of a system that implements raster skipping in co-banded mobile communication devices based on previous scans for any band in accordance with the embodiment of inventive arrangements disclosed herein.

FIG. 1 is a schematic diagram of a system 100 that implements raster skipping in co-banded mobile communication devices based on previous scans for any band in accordance with the embodiment of inventive arrangements disclosed herein. System 100 illustrates a co-banded mobile communication device 110 employing a raster scanning table 132 when scanning for available frequency rasters for establishing a communication channel 162, over which a wireless communication 160 can occur. The mobile communication device 110 can include a plurality of different bands 112-116. Each band 112-116 can represent an access technology associated with a frequency range for operation. The frequency ranges of the bands 112-116 can overlap. Raster scanning table 132 takes advantage of this overlap to reduce scanning time across a band 112-116 by skipping overlapping frequency rasters, which have been recently checked by another band 112-116 and determined to be occupied.

More specifically, a band 112-116 can submit a scanning request 150 to a scanning component 120 that searches for a communication channel 162 over which communication 160 can be conducted. In one implementation, the scanning component 120 can determine a set of rasters 140 that are to be scanned for the request 150 and an order to be used for the scanning, which is performed by scanning engine 122. The scanned rasters 140 can exclude those rasters 140 that have recently been checked by any of the bands 112-116 and found to be occupied. A Last Update Time 146 and an Occupied 148 column of the table 132 can be used in conjunction with a current time from timer 126 to determine whether an associated raster has been recently scanned and found to be occupied or not.

A set of optionally configurable scanning parameters 124 can be used to designate a time-out threshold for rescanning and other scanning specific parameters. For example, the scanning parameters 124 can specify that rasters 140 for a band 112-116 are to be ordered sequentially based upon decreasing power levels and scanned from top to bottom. In one embodiment, the scanning parameters 124 can be used to implement complex rules and logic designed to optimize scanning time and channel 162 acquisition.

For example, the scanning parameters 124 can specify an order in which different bands are to be scanned. For instance, when used in a region predominately supporting GSM communications, parameters 124 can be set so that a dual-channel device 110 supporting GSM and WCDMA can scan a frequency range for GSM before scanning for WCDMA, since it is likely that GSM will occupy a significant portion, if not all, of the available communication rasters in a shared frequency range. In another instance, when the same device 110 is used in a region predominately supporting WCDMA communications, the parameters 124 can be adjusted to cause the scanning component 120 to scan for WCDMA before scanning for GSM. The rules/settings established by the scanning parameters 124 can vary from extremely basic to an arbitrary complexity.

In one embodiment, the table 132 can include frequency rasters 140 for all bands 112-116 supported by the device 110. Columns 142, 144 of the table 132 can indicate which rasters 140 are applicable to which bands 112-116. For example, table 132 shows that rasters 1-5 can be used for Band A (142), but that rasters 4-5 can be used for Band B (144). Thus, the first five rasters 140 of table 132 include two overlapping rasters (e.g., Rasters 4 and 5 associated with frequency 1,930 MHz and 1,931 MHz). When the scanning request 150 is for Band B, Raster 4 can be skipped and Raster 5 can be checked, since the table 140 indicates Raster 4 is in use (148).

As used in system 100, the mobile communication device 110 can be a communication device capable of wireless communication using two or more access technologies, each using a different communication band 112-116. In other words, device 110 is a co-banded communication device. The mobile communication device 110 can include a mobile phone, a two-way radio, a VoIP communication device, a mobile gaming device, a consumer electronic device, an embedded navigation/communication system of a vehicle, and the like.

The band components 112-116 represent hardware, software, and firmware needed for use of a related communication band. For example, the band components 112-116 can include a wireless transceiver, a processor, a modem, and the like, needed for communications involving the related band. Each communication band 112-116 will generally correspond to a particular type of access technology. For example, a Band A can be a Global System for Mobile Communications (GSM) communication band used when communicating via GSM access technology. A Band B can be a Wideband Code Division Multiple Access (WCDMA) communication band used when communicating via WCDMA access technology. Other band components 112-116 can be associated with Time Division Multiple Access (TDMA) technologies, Code Division Multiple Access (CDMA) technologies, IDEN technologies, and the like. In one embodiment, band components 112-116 can be used for personal area network (PAN) communications as well, such as WiFi or WiMax, BLUETOOTH, wireless USB, and the like. Advantages are realized in system 100 in any situation in which a scanning device 110 has an overlapping frequency range of communication rasters for different access technologies.

The communication 160 can be any of a variety of communication types, which include full duplex, half duplex, and simplex real time communications. The communication 160 can include voice communication, media streaming communications, Web interaction communications, data exchange communication transactions, and the like. Further, the communication 160 is not limited to real time communications, but can also include near-real time communications (e.g., media streaming using a delay cache to minimize discontinuities) and other communications, such as Web based interactions that are not considered real-time transactions.

The communication 160 can occur over any network (not shown) capable of conveying digital content encoded within carrier waves. Content can be contained within analog or digital signals and conveyed through data or voice channels and can be conveyed over a personal area network (PAN) or a wide area network (WAN). The network can include local components and data pathways necessary for communications to be exchanged among computing device components and between integrated device components and peripheral devices. The network can also include network equipment, such as routers, data lines, hubs, and intermediary servers which together form a packet-based network, such as the Internet or an intranet. The network can further include circuit-based communication components and mobile communication components, such as telephony switches, modems, cellular communication towers, and the like. The network can include line based and/or wireless communication pathways.

The data store 130 can be physically implemented within any type of hardware including, but not limited to, a magnetic disk, an optical disk, a semiconductor memory, a digitally encoded plastic memory, a holographic memory, or any other recording medium. Data store 130 can be a stand-alone storage unit as well as a storage unit formed from a plurality of physical devices which may be remotely located from one another. Additionally, information can be stored within the data store 130 in a variety of manners. For example, information, such as table 132 information, can be stored within a database structure or can be stored within one or more files of a file storage system where each file may or may not be indexed for information searching purposes. Information stored in data store 130 can also be optionally encrypted for added security.

Figure 2:
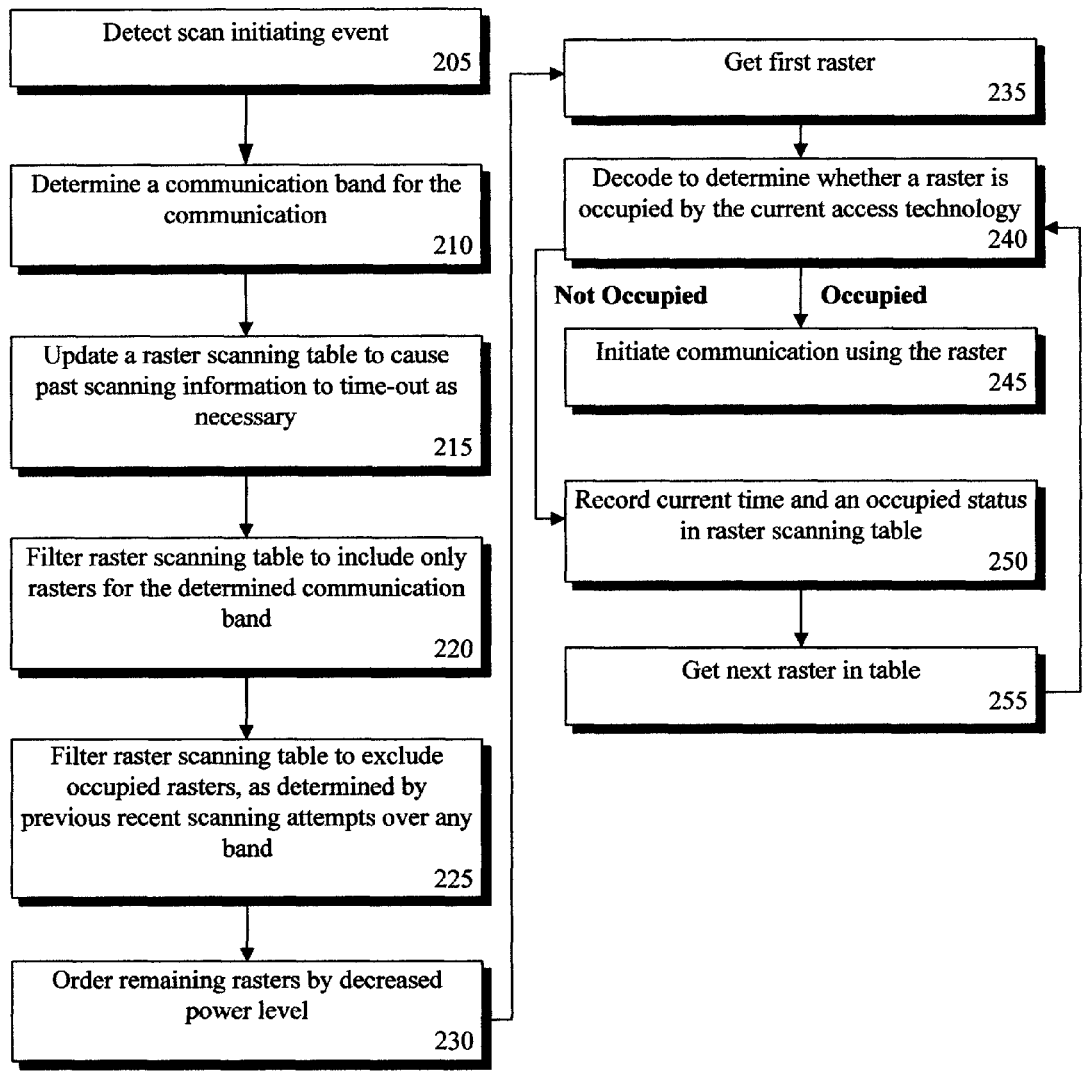
FIG. 2 is a flowchart illustrating a method for raster skipping in co-banded mobile communication devices based on previous scans for any band in accordance with the embodiment of inventive arrangements disclosed herein.

FIG. 2 is a flowchart illustrating a method 200 for raster skipping in co-banded mobile communication devices based on previous scans for any band in accordance with the embodiment of inventive arrangements disclosed herein. Method 200 can be performed in the context of system 100.

The method 200 can begin in step 205, where a scan initiating event can be detected. In step 210, the mobile communication device can determine/select a communication band (e.g., an access technology) to be used for a new communication. In step 215, the mobile communication device can update a raster scanning table to cause past scanning information to time-out as necessary. The following step 220 can include filtering the raster scanning table to include only rasters for the determined communication band.

In step 225, the mobile communication device can filter the raster scanning table to exclude occupied rasters as determined by recent scanning attempts. In step 230, the remaining rasters can be ordered by decreasing power levels to prepare for scanning and decoding attempts by the mobile communication device.

In step 235, the mobile communication device can select the first ordered raster as shown. In step 240, the selected raster can be decoded to determine whether the raster is being used by the currently scanned for access technology. If the raster is occupied, the co-banded device can establish that the raster can be used for communications, as shown in step 245. The method can skip to step 250 if the selected raster is occupied. In step 250, the mobile communication device can record current time and an occupied indicator in the raster scanning table. In step 255, a next potential raster can be selected. This next raster can also be decoded, as shown in step 240.

If an entire set of rasters is searched without finding an available raster, the method can optionally repeat steps 220-255 for a different access technology. For instance, if no rasters are available for WCDMA communications and if the mobile communication device supports both WCDMA and GSM, the steps 220-255 can be repeated for GSM rasters. Appreciably, the mobile communication device can be configured to establish an order of preference to be used to determine a preferential order of use between two or more supported access technologies. Additionally, if all supported bands or access technologies have been scanned and no available raster found, then the scanning can be automatically re-attempted after a previously established delay period occurs.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for improving scan time in a co-banded mobile communication device comprising:
   maintaining a set of records within a data store of a co-banded mobile communication device, wherein the set of records include a plurality of communication rasters that represent an overlap between frequency bands used by different access technologies supported by the mobile communication device;
   scanning frequency bands of a first access technology for occupied communication rasters associated with the first access technology, wherein the first access technology is not a Global System for Mobile communication (GSM) access technology;
   for each occupied communication raster found when the frequency bands of the first access technology are scanned, recording in the set of records an indication that the communication raster is occupied; and
   subsequent and responsive to scanning frequency bands of the first access technology, scanning frequency bands of a second access technology communication rasters associated with the second access technology, wherein the scanning for the second access technology skips those communication rasters indicated as occupied within the set of records and only those which have been scanned within a preselected time period from scanning frequency bands of the second access technology, as indicated in the set of records.

2. The method of claim 1, wherein the set of records comprise a record for each communication raster in the plurality of different frequency bands, and each record includes a scan time indicating when the raster was last scanned.

3. The method of claim 1, further comprising:
   before scanning for the first access technology, ordering a set of communication rasters by power level in descending order, wherein the scanning for the first access technology occurs in the established order; and
   before scanning for the second access technology, ordering a set of communication rasters by power level in descending order, wherein the scanning for the second access technology occurs in the established order.

4. The method of claim 1, wherein the communication device is a co-banded mobile telephone.

5. The method of claim 1, wherein each of the plurality of communication rasters is able to handle real-time voice communications.

6. The method of claim 1, wherein the first access technology comprises a Frequency Division Multiple Access (FDMA) technology, and wherein the second access technology comprises a Time Division Multiple Access (TDMA) technology.

7. The method of claim 1, wherein the first access technology comprises a Wideband Code Division Multiple Access (WCDMA) technology, and wherein the second access technology comprises a Global System for Mobile communication (GSM) technology.

8. The method of claim 1, wherein the first access technology and the second access technology are technologies for Personal Area Network (PAN) communications.

9. The method of claim 1, wherein said steps of claim 1 are steps performed automatically by at least one machine in accordance with at least one computer program having a plurality of code sections that are executable by the at least one machine, said at least one computer program being stored in a machine readable medium.

10. A mobile communication device comprising:
    a first set of band components configured to perform communication operations for wireless communications occurring over a first frequency band;
    a second set of band components configured to perform communication operations for wireless communications occurring over a second frequency band;
    a scanning component configured to scan the first frequency band and the second frequency band for communication rasters, wherein the second frequency band is scanned subsequent to scanning the first frequency band; and
    a data store containing a set of records that include a plurality of communication rasters that represent an overlap between the first frequency band and the second frequency band, wherein when the scanning component performs a scan, the set of records keeping a record of a scan time as to when each of the communication rasters, individually, is found to be occupied, and wherein when searching for available communication rasters, the scanning component skips rasters determined to be occupied by previous, recent scans performed against a different one of the first frequency band and the second frequency band when the scan time of the raster indicates the raster was scanned within a preselected period of time from present scan time, and when the scan time of the raster is not within the preselected period of time the raster is not skipped.

11. The mobile communications device of claim 10, wherein the first set of band components support a first access technology, and wherein the second set of band components support a second access technology.

12. The mobile communication device of claim 11, wherein the first access technology comprises a Frequency Division Multiple Access (FDMA) technology, and wherein the second access technology comprises a Time Division Multiple Access (TDMA) technology.

13. The mobile communication device of claim 11 wherein the first frequency band is for a Wideband Code Division Multiple Access (WCDMA) technology, and wherein the second frequency band is for a Global System for Mobile communication (GSM) technology.

14. The mobile communication device of claim 10, wherein each of the scanned for communication rasters is able to handle real-time voice communications.

15. The mobile communication device of claim 10, wherein the wireless communication device is a co-banded mobile telephone.

16. The mobile communication device of claim 15, wherein the co-banded mobile telephone supports Wideband Code Division Multiple Access (WCDMA) via the first set of band components, and supports Global System for Mobile (GSM) communications via the second set of band components.

* * * * *